Feb. 2, 1932.   O. W. ORTH ET AL   1,843,141
ANIMAL TRAP
Filed Dec. 15, 1928
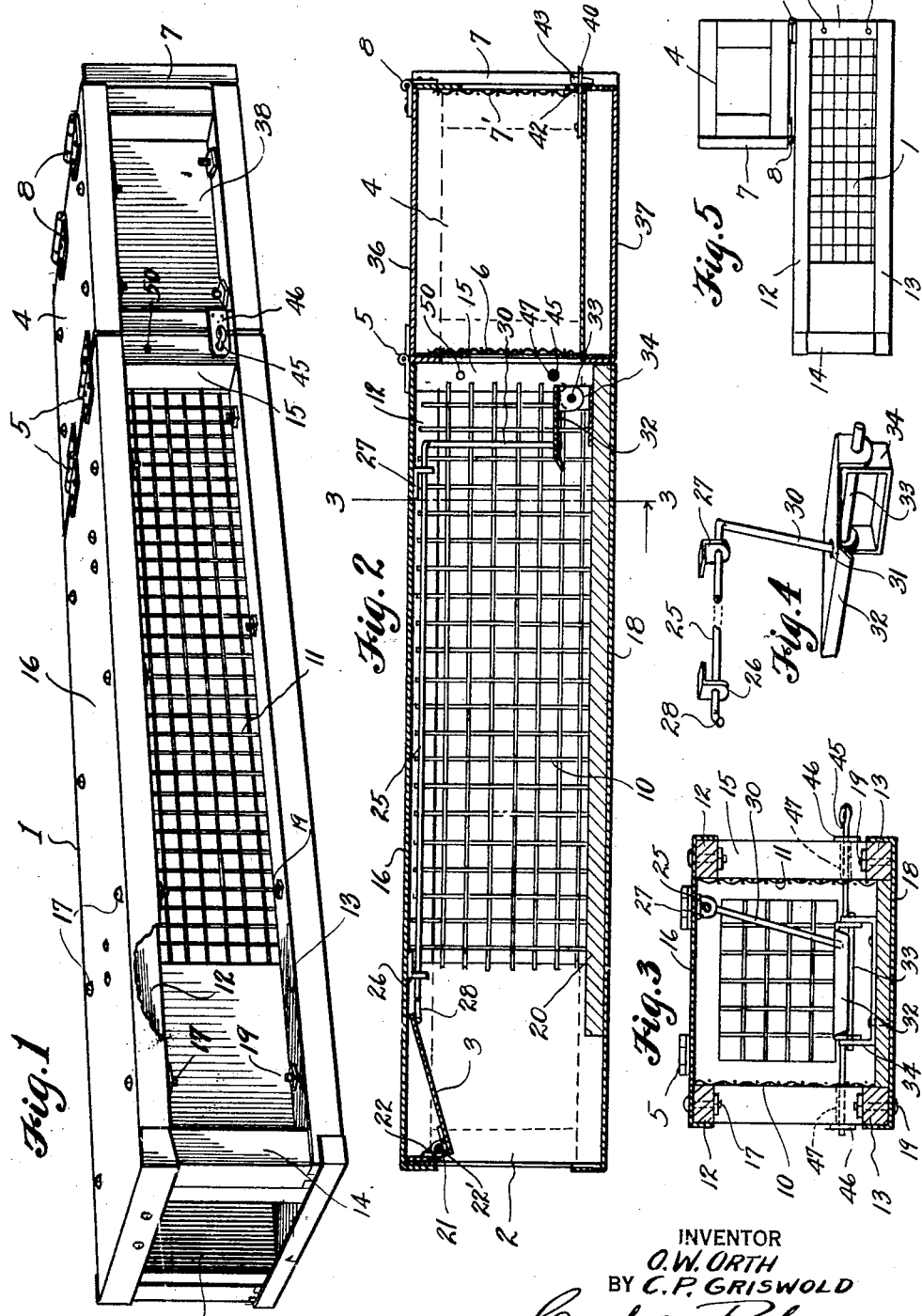
INVENTOR
O. W. ORTH
BY C. P. GRISWOLD
Cook & Robinson
ATTORNEY Patented Feb. 2, 1932

1,843,141

UNITED STATES PATENT OFFICE

ORWEN W. ORTH AND CLYDE P. GRISWOLD, OF SEDRO WOOLLEY, WASHINGTON

ANIMAL TRAP

Application filed December 15, 1928. Serial No. 326,340.

This invention relates to improvements in animal traps, and has particular reference to traps of that character employing a cage, or inclosure, into which the animal is lured and within which it is then trapped by the closing of a spring actuated door that is arranged to be tripped by the animal after it has entered the cage.

It is the principal object of this invention to provide a trap of the above character that is especially designed for the trapping of fox, mink, skunk and similar animals and which is relatively inexpensive to manufacture, easy to bait and set, which is fool proof in that all of the moving parts are contained interiorly of the trap, and which will trap and retain the animal without damage or injury thereto.

It is also an object of the invention to so construct the trap that it may be taken apart or collapsed so as to greatly facilitate its being transported.

A still further object of the invention resides in the provision of an additional cage in connection with the trap cage for the inclosing of live bait; this live bait cage being hingedly attached to the trap cage and movable to a certain position at which easy access may be had to the trap cage for setting the trap door tripping means.

Other objects of the invention reside in the various details of construction and in the combination of parts as will hereinafter be described.

In accomplishing these objects, we have provided the improved details of construction, the preferred forms of which are illustrated in the accompanying drawings, wherein—

Figure 1 is a perspective view of a trap constructed in accordance with the present invention.

Figure 2 is a longitudinal sectional view of the same, showing the trap door set.

Figure 3 is a cross section taken on the line 3—3 in Figure 2.

Figure 4 is a perspective view of the trap door releasing device.

Figure 5 is a view illustrating the manner of adjusting the live bait cage in order to give access to the trap cage for setting it or for removal of the trapped animal.

Referring more in detail to the several views of the drawings—

In its preferred form of construction, the trap comprises a main cage 1 of elongated, box-like form, rectangular or square in cross section, and provided at one end with an opening forming an entrance 2 adapted to be closed by the trap door 3. At the other end of the cage 1, is a smaller cage 4 for containing live bait and this latter cage is attached to the main cage by hinges 5 so that it may be swung upwardly and against the top wall of the cage 1, as is shown in Figure 5. The cage 4 is closed at its inner end by a permanent wire mesh wall 6 and, at its outer end, has a door 7 attached by hinges 8 at its upper edge.

Briefly describing the various features of construction of cage 1, this comprises the opposite side walls 10 and 11 formed of wire netting of a suitable mesh; the wire netting strips being stapled, or otherwise fixed, along their top and bottom edges to the inside faces of wooden rails 12 and 13 and, at their ends, are fixed to vertical, wooden rails 14 and 15. The top wall of the cage is formed by a flat piece of sheet metal 16 which overlaps and is turned down over the wooden rails 12 and is secured thereto by a plurality of bolts 17. The bottom wall of the cage is likewise formed from a strip of sheet metal 18 that underlaps and is turned up along the outer faces of the rails 13, and which is fixed thereto by a plurality of bolts 19. A wooden floor 20 is laid over the sheet metal plate 18 in order to give protection to the trapped animal; it being a fact that a metal floor in a trap of this character is dangerous to the welfare of the animal if the animal is caged for any length of time.

The trap door 3 swings inwardly and upwardly to open position and is pivotally mounted at its upper edge on a pivot pin 21 supported at its ends in a bracket 22 that is attached to the trap frame above the entrance 2, and a spring 22' is coiled about the pin and bears at its opposite ends against the door and against the end wall of the cage, respectively, in order to throw the door downwardly to closed position when it is released from the open position as shown in Figure 2.

The means which we have provided for retaining the trap door 3 in open position and which is operable to release it, comprises a rod 25 that extends in the lengthwise direction of the cage and is rotatably contained within supporting guides 26 and 27 which retain it closely adjacent the top wall 16. One end of the rod 25 has an angularly and longitudinally directed end portion 28 adapted to engage with the underside of the edge of the door 3 to support it in raised position and the other end of the rod 25 has a downwardly directed portion 30 adapted to be projected into an aperture 31 in a foot treadle 32 that is pivotally mounted by a horizontal pin 33 supported by a bracket 34 which is fixed on the floor of the cage. The downturned portion 30 of the rod is of such length that it will be retained within the treadle aperture when the latter is in raised position, but depression of the treadle will disengage it from the rod portion 30 and the latter, being released, will permit the rod 25 to rotate under the pressure of the trap door against the opposite end portion 28 and will thereby permit the release of the trap door so that the spring 22' will snap it to closed position. When the trap is set, the treadle 32 is yieldably retained in raised position by the pressure of the spring 22' acting through the rod 25 in a manner which tends to rotate the rod, causing the portion 30 to bear tightly against the aperture in the treadle.

The cage 4 is of substantially the same construction as the main cage and consists of metal top and bottom walls 36 and 37 and sheet metal side walls 38. The door 7, however, is provided with a wire mesh panel 7'. A strap 40 is fixed to the floor of this cage 4 and projects through a slot 42 adjacent the bottom edge of the door and is adapted to receive the locking key 43 therethrough to hold the door 7 in closed position.

For holding the cage 4 in closed position with respect to the cage 1, so that the two parts assume the relation as shown in Figure 1, we have provided the locking rod or pin 45 adapted to be extended through apertured ears 46 that are fixed to the end of the cage 4 and also to be projected through openings 47 formed in the frame rails 15 in registration with the apertures of said ears.

Assuming the trap to be so constructed, its use would be as follows: For setting the trap, the cage portion 4 would be unlocked by removal of the pin 45 and then swung upwardly to the position as shown in Figure 5. This gives access to the setting mechanism. The trap door 3 is then pushed inwardly and upwardly to the position as shown in Figure 2, and the rod 25 is adjusted so that its end portion 28 will support the door in this position. The end portion 30 of the rod 25 is then held in position to be placed within the aperture 31 of the treadle 32 when the latter is lifted upwardly. The downward pressure of the door 3 against the laterally directed end 28 of the rod tends to rotate the rod so that the depending end portion 30 bears against the treadle and yieldingly retains it in set position. The cage 4 is then swung downwardly to the position of Figure 1 and is locked by projecting the pin 45 through the apertured ears 46 and opening 47 in the frame. If live bait is to be used in the trap, this is then placed within the cage 4 and the door 7 closed and locked. An animal, on entering the trap through the opening 2, advances toward the opposite end and in trying to gain access to the bait in cage 4, will step on the treadle 32 pressing it downwardly, thereby releasing the rod end 30 so that it may move in such manner as to release the door 3 which is snapped to closed position by the spring 22'.

When it is desired to remove the trapped animal, the cage 4 is swung upwardly, after removal of the pin 45, and the animal is removed or released through the end of the trap thereby opened.

Should it not be desired to use live bait, the entire cage 4 may be detached from the cage 1 and this end then closed by the door 7 removed from the cage 4, or by another similar door. The pin 45 may then be projected through suitable openings, as at 50, formed in the rails 15 and any suitable bait may then be hung on this pin within the trap.

Traps of this character may be made in various ways and various details of construction could be changed without departing from the spirit of the invention, and for this reason, we do not wish to be limited in our claims only to the details shown.

It is also apparent that the construction and assembly of the various parts permits them to be easily and quickly disassembled for collapsing the device as is desired when they are to be packed or transported.

The most advantageous features of this construction reside in the fact that none of the tripping or releasing parts are contained exteriorly of the device and this permits its being placed underground or under brush piles without danger of outside interference to the mechanism. Also, the all metal construction prevents escape of the trapped animal and the wooden floor gives protection to the trapped animal.

Having thus described our invention, what we claim as new therein and desire to secure by Letters Patent, is:

1. A trap of the character described, comprising a main cage open at its inner end, an inwardly and upwardly swinging trap door at the outer end, yieldable means urging the door to closed position, a trip mechanism for holding the door in open position and comprising a movably supported treadle disposed within the inner end portion of the cage; a rod supported within the cage, having a lateral arm at one end engagable with the trap door to support it in open position, and having a downwardly projecting leg at its other end engagable with the treadle when it is raised, to thereby hold the parts in set position, to be released when the treadle is depressed to permit rotation of the rod and a resultant releasing of the trap door from the lateral arm.

2. A trap of the character described, comprising a main cage open at its inner end, an inwardly and upwardly swinging trap door at the outer end, yieldable means urging the door to closed position, a trip mechanism for holding the trap door in open position, and comprising a movably supported treadle disposed within the inner end of the cage, and having an opening therein; a rod supported longitudinally of the cage, having a lateral arm at one end engageable with the trap door to support it in open position, and having a downwardly projecting leg at its other end disposed within the opening of the treadle to hold the parts in set position, to be released when the treadle is depressed, to thereby permit closing of the trap door, and a cage for live bait hingedly attached to the main cage to be adjusted against or away from the open end of the main cage.

Signed at Sedro Woolley, Washington, this 7th day of November, 1928.

ORWEN W. ORTH.
CLYDE P. GRISWOLD.